(12) United States Patent
Pettersen

(10) Patent No.: US 6,899,261 B2
(45) Date of Patent: May 31, 2005

(54) METHOD AND ARRANGEMENT FOR A MARTENSITE-FREE BRAZING PROCESS

(75) Inventor: Ola Pettersen, Lund (SE)

(73) Assignee: Safetrack Baavhammar AB, Staffanstorp (SE)

( * ) Notice: Subject to any disclaimer, the term of this patent is extended or adjusted under 35 U.S.C. 154(b) by 268 days.

(21) Appl. No.: 10/144,796

(22) Filed: May 15, 2002

(65) Prior Publication Data

US 2002/0190097 A1 Dec. 19, 2002

(30) Foreign Application Priority Data

May 15, 2001 (SE) ............................................. 0101688

(51) Int. Cl.[7] .......................... B23Q 15/00; B23K 31/12

(52) U.S. Cl. ..................... 228/11; 219/129; 219/130.33

(58) Field of Search ................................ 228/8, 10, 11, 228/15.1, 103, 247; 219/129, 130.33

(56) References Cited

U.S. PATENT DOCUMENTS

| | | | | |
|---|---|---|---|---|
| 2,692,935 A | * | 10/1954 | Pearce et al. | ............... 219/230 |
| 3,032,637 A | * | 5/1962 | Wasserlein | .................. 219/234 |
| 3,035,155 A | * | 5/1962 | Hawk | ............................ 219/75 |
| 3,911,246 A | * | 10/1975 | Drinkard, Jr. | ............... 219/234 |
| 4,081,656 A | * | 3/1978 | Brown | ................... 219/137.31 |
| 4,493,986 A | * | 1/1985 | Carter et al. | ............. 219/85.16 |
| 4,528,437 A | * | 7/1985 | Burnett et al. | ........... 219/85.14 |
| 5,313,045 A | | 5/1994 | Baavhammar | |

* cited by examiner

*Primary Examiner*—Jonathan Johnson
(74) *Attorney, Agent, or Firm*—Jacobson Holman PLLC

(57) ABSTRACT

An apparatus for brazing a connecting piece of electrically conducting material such as metal, to a metal surface by means of a new type of temperature-controlled brazing whereby for certain types of material a brazing is obtained that is free of martensite formation underneath the brazed joint in, for example, railway track and/or pipework. The apparatus has an electrode and processing circuitry by which a voltage applied in electrical circuit with the electrode causes an electric arc to be struck between the electrode and an adjacent workpiece to generate the heat necessary for brazing.

13 Claims, 12 Drawing Sheets

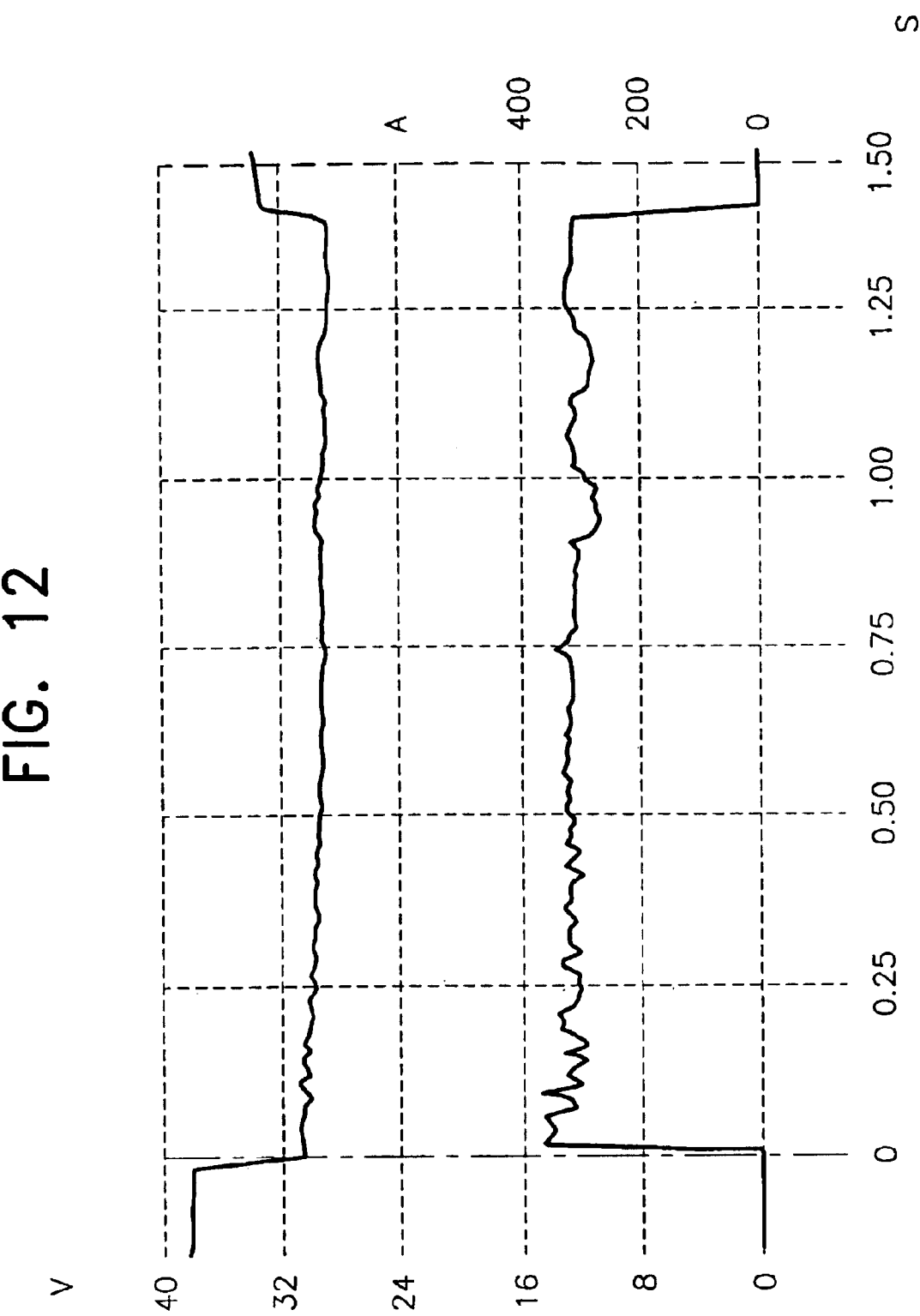

METHOD AND ARRANGEMENT FOR A MARTENSITE-FREE BRAZING PROCESS

BACKGROUND OF THE INVENTION

1. Field of the Invention

The present invention relates to a new method for brazing for example a connecting piece of electrically conducting material, for example of metal, to a metal surface by means of a new type of temperature-controlled brazing, whereby for certain types of material, for example steel, a martensite-free brazing is obtained, i.e. a brazing is produced without any deleterious structural changes (martensite formation). A brazing is obtained that underneath the brazed joint is completely free of martensite formation in for example railway track (rails) and/or piping. The present application also describes an arrangement for carrying out the method.

2. Description of the Related Art

Developments in railway traffic involve ever higher speeds and heavier axle loads. This in turn places increasing demands on the strength of railway track and its ability to withstand wear and accordingly rails are manufactured from higher-alloyed steel in order to meet these more stringent requirements. The material from which rails are manufactured is sensitive to thermal influences that can cause structural changes known as martensite formation (hardening effect).

Martensite formation may lead to crack formation in the rail material and due to the higher loads the rail may fracture, with catastrophic consequences for railway traffic. Consequently it is very important to braze signal and other wiring and cabling firmly to the rail by using a method that does not cause martensite formation in the rail.

Up to now it has only been possible to minimise martensite formation or structural changes by means of a pin brazing method, which is described in Swedish patent 9003708-6 (469 319). Hitherto it has not been possible by any pin brazing method to completely eliminate martensite formation in electrical contact connections that are intended to join two or more objects by means of an electrical connection.

The most serious problem in current methods employed on railway track is the large amount of heat that is produced underneath the brazing joint, which is caused by the electric arc that is generated in the brazing process and produces a deleterious structural change or martensite formation.

Another problem has been the electrode per se used in the process, which is discharged from a brazing pin. The brazing pin contains both flux material and brazing metal and at the start of the process an electric arc is ignited and flux flows from the brazing pin to the brazing joint and cleans the latter. Following this brazing material flows from the brazing pin to the brazing joint. Finally, the brazing pin is pressed downwardly into the brazing melt and penetrates the brazing joint. In order to produce a connection between the metal surface on the rail/piping and cable shoe, at the present time a cable shoe is provided with an opening so that flux material and brazing material can pass from the brazing pin through the cable shoe and then firmly braze the cable shoe to the flat or curved metal surface. At the start of the brazing process the electric arc acts directly on the rail and produces a very high local temperature which is then transmitted indirectly via the brazing melt and generates high temperatures directly in the rail, which have a deleterious effect on the latter. There is also the risk of an alloying of electrode material in the brazing when using conventional pin brazing systems, which has adverse effects on both the brazing and workpiece. The final stage in the currently employed pin brazing involves pressing the brazing pin downwardly into the brazed joint and then breaking off the pin, which has a negative effect on the brazed joint itself.

Another practical problem with conventional brazing processes is the poor grounding of workpieces, which causes a large amount of unsuccessful brazing. With conventional pin brazing the rail constitutes the opposite pole or terminal to the electrode. This requires special operating procedures and separate equipment. For this reason it is desired to be able to make changes as regards the brazing process.

Furthermore, a disadvantage of current brazing processes is the cable shoe, which is fastened by means of brazing pins containing flux material as well as brazing material. The cable shoes that are currently employed have a flat end with a hole which enables brazing to flow therethrough from the upper side of the cable shoe and then secure the latter to a metal surface. Since the brazing process takes place rapidly a large amount of heat is required, which is transmitted from the electric arc via the brazing through the cable shoe to the workpiece/rail. The problem has been that a satisfactorily secure brazing has to be produced at the same time without causing any structural change underneath the brazed joint. Up to now it has only been possible to minimise martensite formation by the process described in Swedish patent 9003708-6.

SUMMARY OF THE INVENTION

The present invention relates to a new brazing process in which by avoiding the use of previously known combinations of various methods it has been possible to devise a new martensite-free brazing process that produces a desired end result, but which has not been able to be achieved by means of any hitherto known brazing processes.

At the present time in France, Italy, Switzerland, Spain and Germany it is prohibited to use pin brazing on railway track on account of martensite formation.

Certain other countries where pin brazing on railway track is currently permitted are in the process of changing their requirements and consequently existing pin brazing methods will no longer be allowed to be used in the future.

The present invention relates to a new method of temperature-controlled brazing together with an arrangement for carrying out the said method in which the problem of martensite formation affecting other methods is solved.

An object of the present invention is to generate an electric arc via a carbon electrode so as to produce a brazing without the electric arc coming into direct contact with the rail.

Another object is that the carbon electrode itself constitutes an electrical resistance in the brazing process and in which the length, diameter and shape of the carbon electrode influence the electrical resistance in the process and consequently also influence the current intensity and voltage in the brazing process.

An advantage of the new brazing process is that carbon powder from the carbon electrode is released during the brazing process and is deposited on the upper surface of the electrically conducting connecting piece, for example a cable shoe, and prevents the formation of a cavity in the cable shoe during the brazing process. In addition the electric arc is established between two carbon poles, which has a stabilising effect on the electric arc and counteracts the tendency of the current to vary over time. Furthermore the thermally insulating properties of carbon have a temperature distributing function. The carbon powder from the carbon electrode consequently also acts as a buffer material, thereby preventing too high a temperature in for example the rail during the brazing process.

The electric arc also produces an electrical resistance in the brazing process, and in which the length of the electric arc, i.e. the distance between the electrode and opposite pole, may be varied within certain limits. With a large lifting height the voltage drops and the arc is extinguished, while with a small lifting height the current intensity increases and a small lifting height is also associated with an increased risk of short-circuiting. The carbon electrode provides an optimum control over the arc length during the brazing process since the carbon material is more resistant than a melting metal electrode and consequently the carbon electrode undergoes a negligible change in length.

Yet another object of the present brazing process is to prevent the electric arc coming into direct contact with the workpiece, which object is achieved if the electrically conducting contact connection consists of a solid plate of compact, electrically conducting material, for example copper. The present brazing process does not involve flux material or brazing material from any brazing pin forming an electrode. All the brazing material does not have to flow through the cable shoe to the underlying workpiece. In the present brazing process, due to the construction of the cable shoe flux material and brazing material are situated underneath the electrical contact connection itself, for example a cable shoe. The whole plate of compact, electrically conducting material, for example copper, forms a buffer that prevents too high a temperature influencing for example the rail and leading to martensite formation. In the present process the electrode is not finally forced downwardly into the brazing and there is no risk of adversely affecting the brazinged joint.

Another object of the present invention is to control the current intensity during the process. Raising the electrode increases the arc length. This in turn leads to a large voltage drop over the arc and to a reduced current intensity in the electrical circuit. The arc length cannot be increased completely arbitrarily since after a certain length the arc collapses due to the fact that the resistance becomes too great. A small interspacing between the electrode and workpiece, the so-called lifting height, reliably prevents the arc being extinguished during the brazing process. It is very advantageous to have a low current intensity during the process since this prevents martensite formation.

The conventional method up to now is to employ a guard ring of ceramics material, which still has a function in certain situations. In the present invention it is preferred to use a guard ring of metal, but a guard ring consisting of a combination of both materials is also preferred since a combination effect increases the protection conferred on the brazing gun.

From the point of view of energy consumption the material and design of the guard ring play an important role. Guard rings consisting of an electrically conducting compact material, for example metal, are designed so as to have a good heat-retaining capacity in the brazing process and to be resistant while retaining their shape and function during the whole brazing process. The heat that is absorbed by the guard ring is conducted to the cable shoe. The overall result is that relatively less energy and/or power are consumed in the process for achieving a martensite-free brazing.

The guard ring together with the gripping sleeve also prevent the operator from coming into contact with the arc itself or with the hot gases that are formed. This reduces the need for protective equipment for the operator. This also eliminates the risk to the operator of eye injury and others who happen to look towards the arc during the brazing process.

A further advantage of this new brazing process is that the rail does not need to be grounded during the brazing. In the brazing process the electrode serves as one pole of the arc and the other pole is formed by the electrically conducting connecting piece, for example a cable shoe. In this case the electrically conducting connecting piece forms the negative pole, conventionally called the connection in grounding terminology. In the present brazing process the electrode may form the positive pole or negative pole, or alternately positive/negative pole. It is an advantage not to use the rail as a pole since secondary arcs may be formed between the cable shoe and rail, which may have a negative effect on the rail in the form of martensite formation. Moreover, by excluding the rail from the closed electrical circuit the cause of possible interfering signals in the rail and apparatus connected thereto is eliminated. The use of the cable shoe as one pole also eliminates a workstage and in certain situations grounding equipment associated with the brazing. The cable shoe can be connected to the electrical circuit via the guard ring in the brazing gun or via the cable connected to the cable shoe.

The characterising feature of the present invention is disclosed in the following patent claim.

BRIEF DESCRIPTION OF THE DRAWINGS

FIG. 12 is a voltage/current diagram of the brazing process, in accordance with the present invention;

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
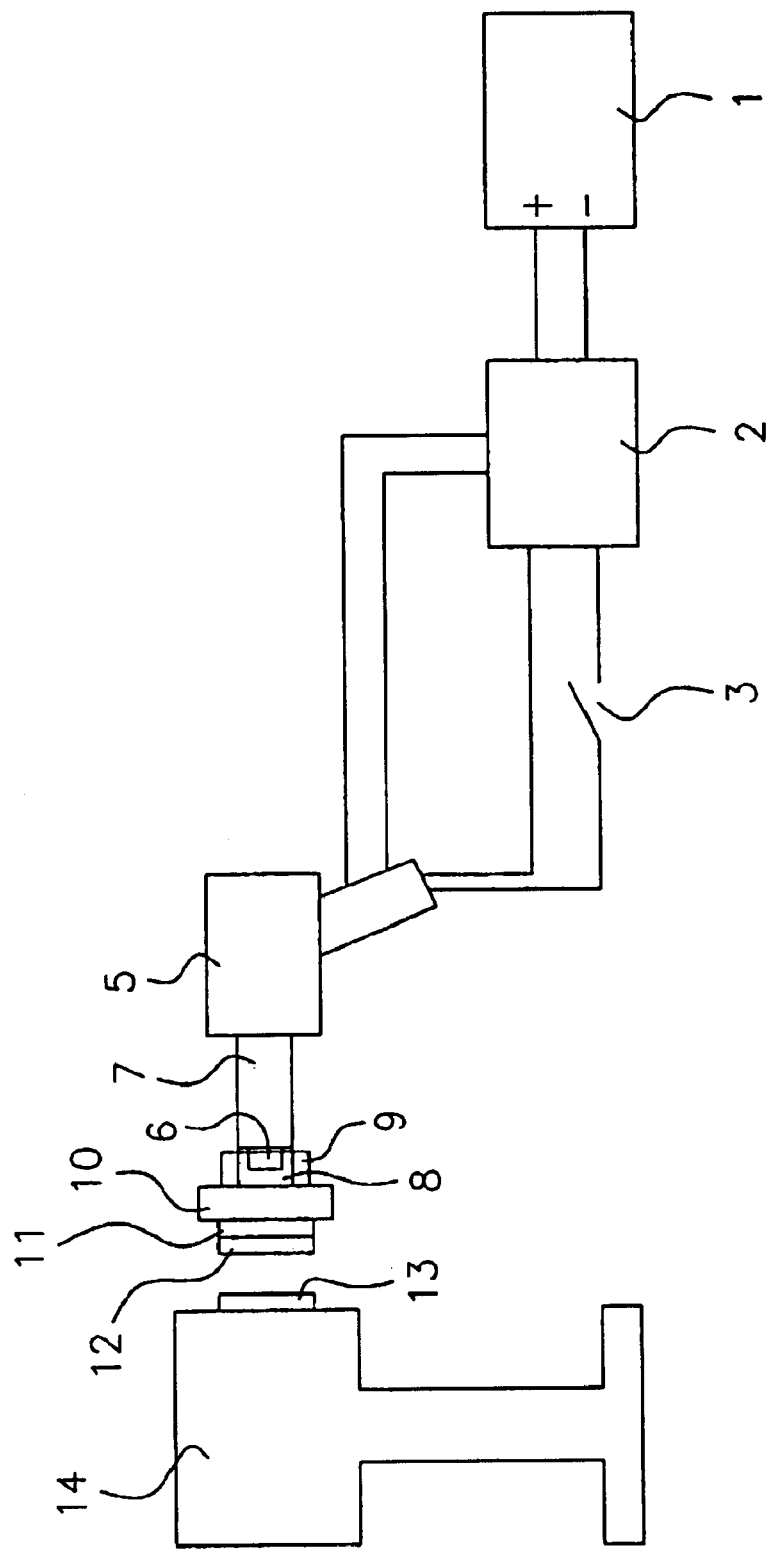
FIG. 1 shows diagratmriatically an outline of the brazing process.

FIG. 1 illustrates diagrammatically the necessary components and the procedure of the brazing process per se, the power source that is normally used being a battery 1 from which the current is conducted to an electronics unit 2. The electronics unit 2 processes data received from the brazing gun 5 via its power supply cable and signal cable as well as data from the external power source. The electronics unit 2 processes all information and regulates the current and voltage supply to the brazing gun 5, for example by regulating the voltage level and/or one or more resistors, and by regulating its additional resistance the time and current consumption can be controlled during the brazing process and in this way a satisfactory brazing can be achieved, with minimal energy consumption, also combined with a control of the temperature in the base material/workpiece.

When the circuit breaker 3 closes the electrical circuit comprising a lifting magnet in the brazing gun 5, the carbon electrode 6 that is situated in the electrode holder 7 initially short-circuits the circuit with the cable shoe 10, so that when subsequently the electromagnet lifts the carbon electrode 6 from the cable shoe 10 to light an electric arc 8 that is protected by one or more guard rings 9, it operates on the compact flat surface of a cable shoe 10, the cable shoe forming one pole and the carbon electrode 6 forming the other pole. Heat is transmitted via the cable shoe 10 and activates the flux material 11 between the cable shoe 10 and a brazing material 12 and prepares and cleans the surface for a brazing between the brazing material 12 and cable shoe 10, and when the brazing material 12 heats up it activates the flux material 13 on the workpiece 14 and a brazed joint is formed by the brazing material 12 on the workpiece 14. Consequently the cable shoe 10 is brazed firmly to the workpiece 14 without the electric arc 8 coming into direct contact with the workpiece 14. Furthermore, no undesired sparks/arcs are produced between the rail 14 and cable shoe 10 since the electrical connection is formed via the cable of the cable shoe 10 or via the guard ring 9, and not by the workpiece 14 per se. In the new brazing process the whole plate of compact, electrically conducting material, for example copper, forms a buffer that prevents high temperatures affecting for example the rail and leading to martensite formation. Carbon powder is emitted from the carbon electrode 6 during the brazing process and is deposited in the form of a thin layer on the underlying electrically conducting connecting piece, for example a cable shoe 10, and prevents a cavity being formed in the cable shoe 10 during the brazing process.

Furthermore the electric arc is maintained between two carbon poles, which has a stabilising effect on the arc and counteracts the tendency of the current to fall over time. Since carbon has a thermally insulating property it performs a temperature distributing function. The carbon powder from the carbon electrode 6 furthermore acts as a buffer material so that the temperature is not too high when for example the rail is subjected to the brazing process.

From the energy point of view the guard ring 9 consisting of an electrically conducting material, for example metal, has an important role during the brazing process. The guard ring 9 is formed so that it exhibits a good thermally insulating function. When the guard ring 9 consists of a ceramics material having a toothed lower edge, the hot gases that are formed during the brazing process are discharged radially. When the guard ring consists of metal the gases leave the guard ring in the axial direction and therefore more heat is transmitted to the guard ring 9. The guard ring 9 retains its shape and function and is stable during the whole brazing process. The heat that is absorbed by the guard ring is conducted to the cable shoe 10. The result is that less electrical energy and/or power is consumed during the brazing process and a martensite-free brazing takes place.

Figure 2:
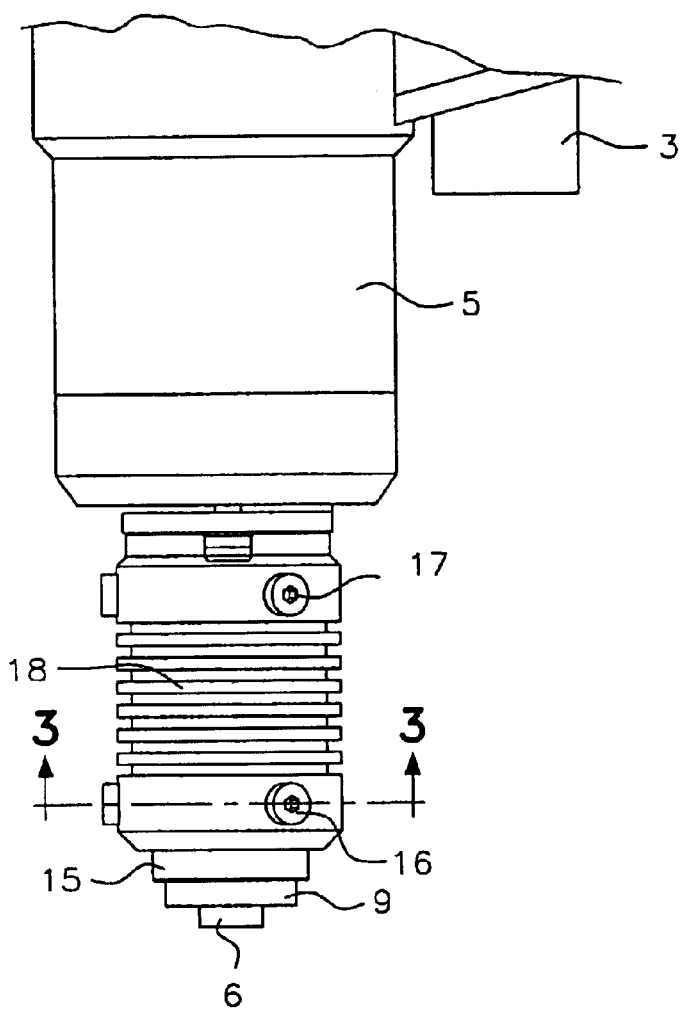
FIG. 2 is a side view of the brazing gun in accordance with the present invention.

FIG. 2 is a side view of the brazing gun 5, at the front of which can be seen the carbon electrode 6. Before starting the brazing process the gun 5 together with the carbon electrode 6 is pressed down against the cable shoe 10, whereby the carbon electrode 6 being pressed flush with the lower edge of the guard ring 9. The guard ring 9 is secured in a ring holder 15. When the circuit breaker or start button 3 is pressed the circuit is short-circuited, following which the lifting magnet raises the electrode 6 a certain height over the electrically conducting connecting piece 10 and an arc 8 is struck. The guard ring 9 and a gripping sleeve 18 shield the operator from the process. The figure also shows a screw 16 for ejecting the guard ring and a screw 17 for ejecting the electrode. During the brazing process the guard ring 9 can act as a terminal in a grounding operation.

Figure 3:
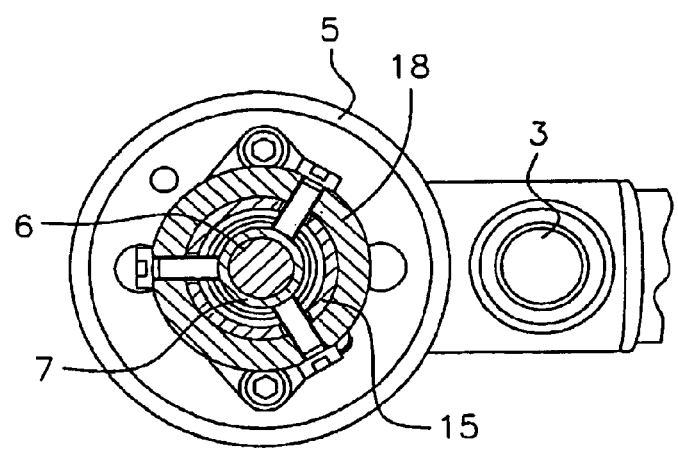
FIG. 3 shows the brazing gun of FIG. 2 viewed from the front.

FIG. 3 shows a section of the brazing gun 5 seen from the front, in which the circuit breaker 3 can be seen and in the centre of the mouth of the gun is located the carbon electrode 6 in the electrode holder 7 together with the ring holder 15 and gripping sleeve 18.

Figure 4A:
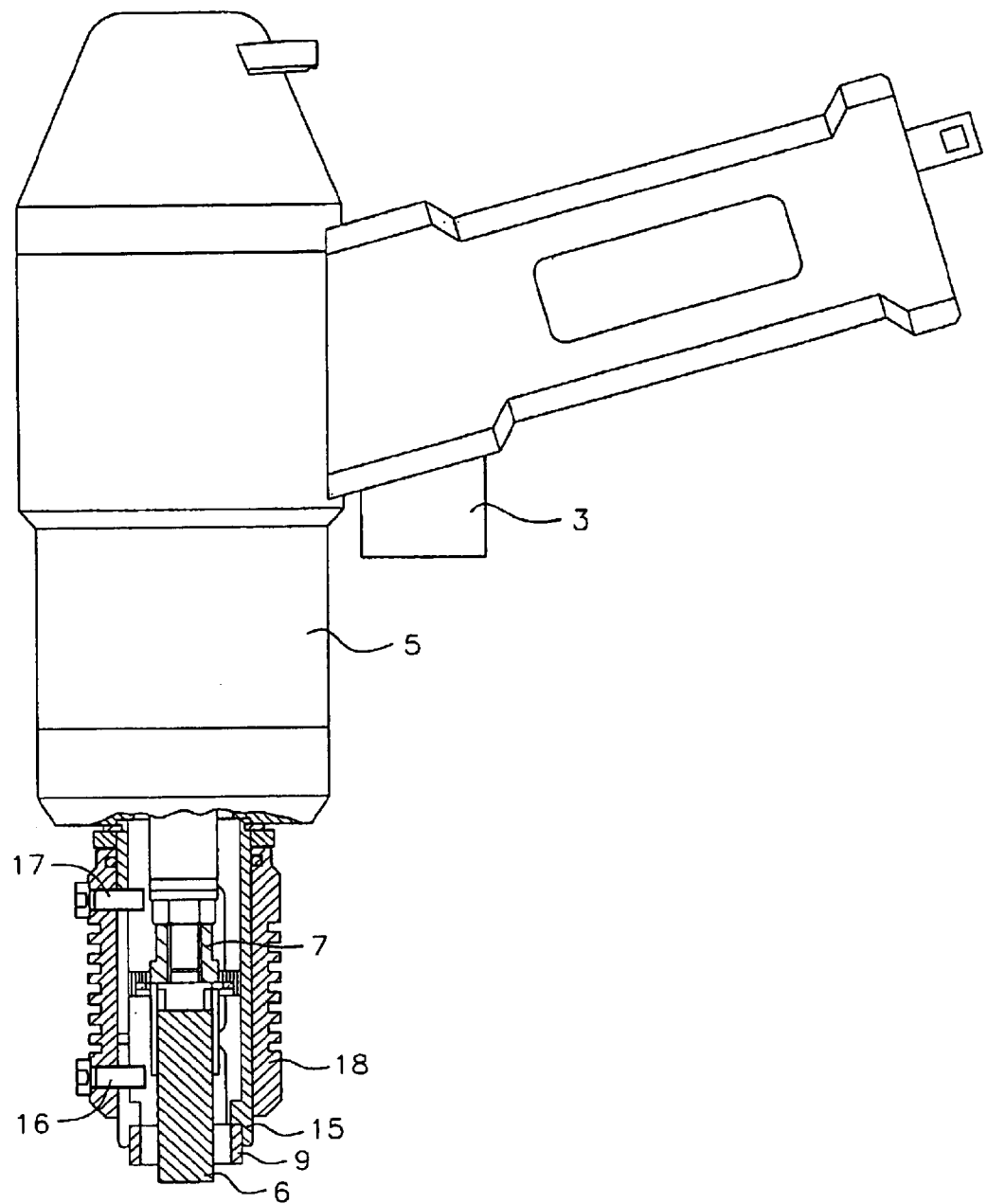
FIGS. 4A, 4B and 4C are cross-sections of the brazing gun of FIG. 2.

FIG. 4A is a cross-section of the brazing gun 5 and shows the circuit breaker 3, the carbon electrode 6 in the electrode holder 7 and guard ring 9 of metal in the ring holder 15 together with the gripping sleeve 18, the screw 16 for ejecting the guard ring and the screw 17 for ejecting the electrode. A very important component in the brazing process is the carbon electrode, which forms an electrical resistance, and in which the length, diameter and shape of the carbon electrode influence the electrical resistance in the process and accordingly also the current strength and the voltage during the brazing procedure.

Figure 4B:
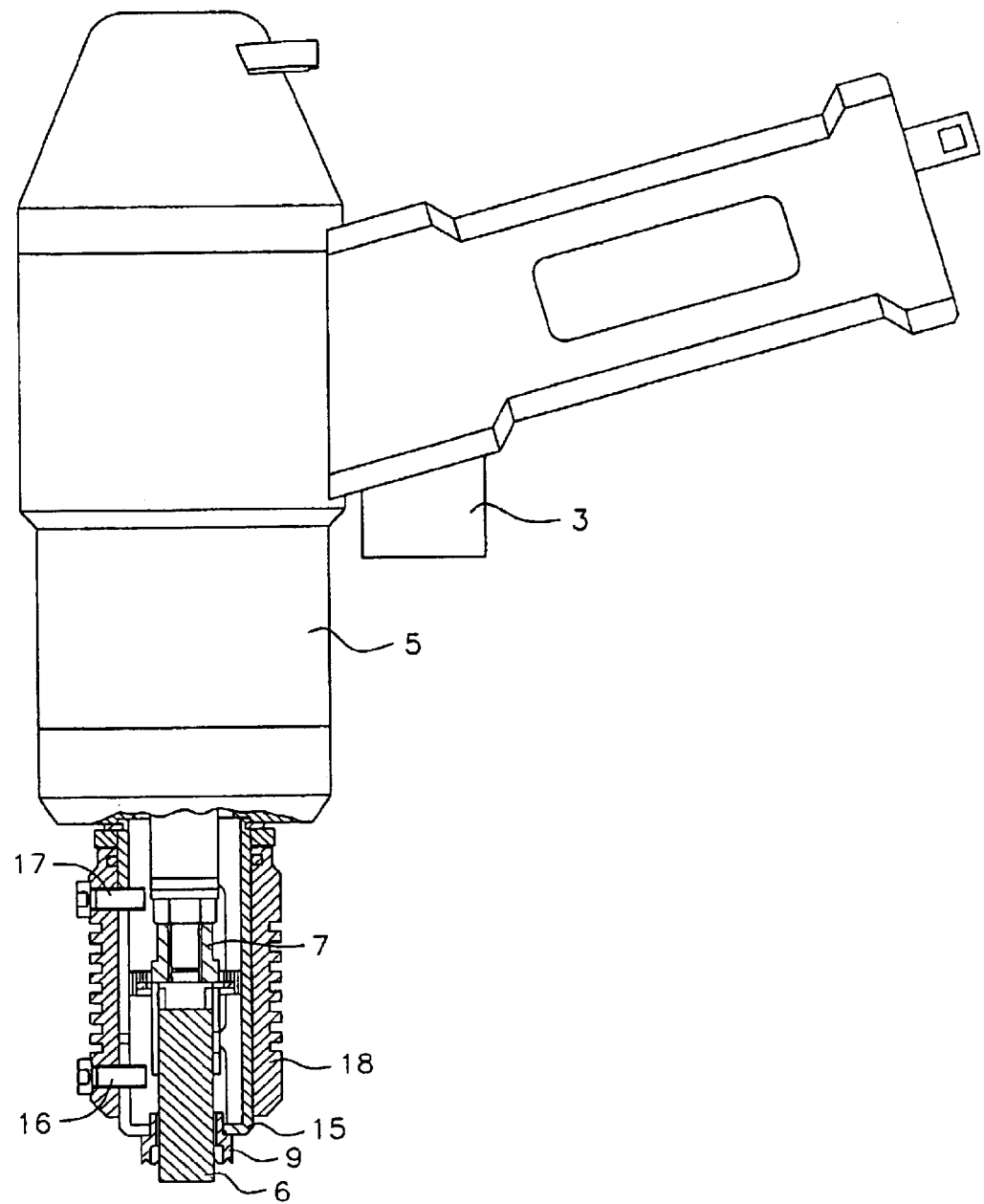

FIG. 4B shows the same brazing gun as in FIG. 4A, except that the guard ring 9 consists of ceramic material.

Figure 4C:
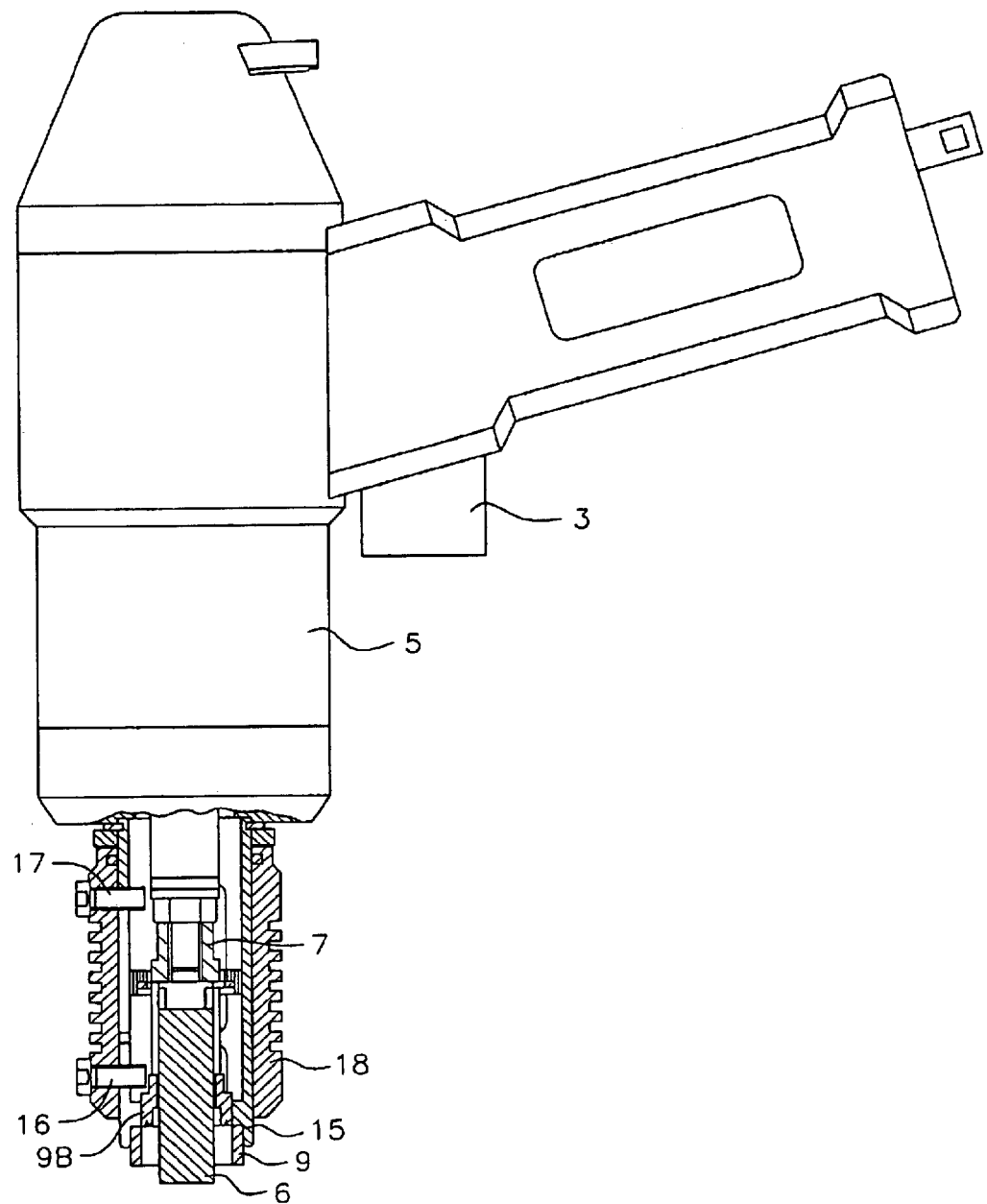

FIG. 4C shows the same brazing gun as in FIG. 4A but in this case the guard ring 9 consists of metal, though there is also an extra guard ring 9B of ceramic material, which is placed inside the metal ring. The two guard rings produce a combined effect.

Figure 5:
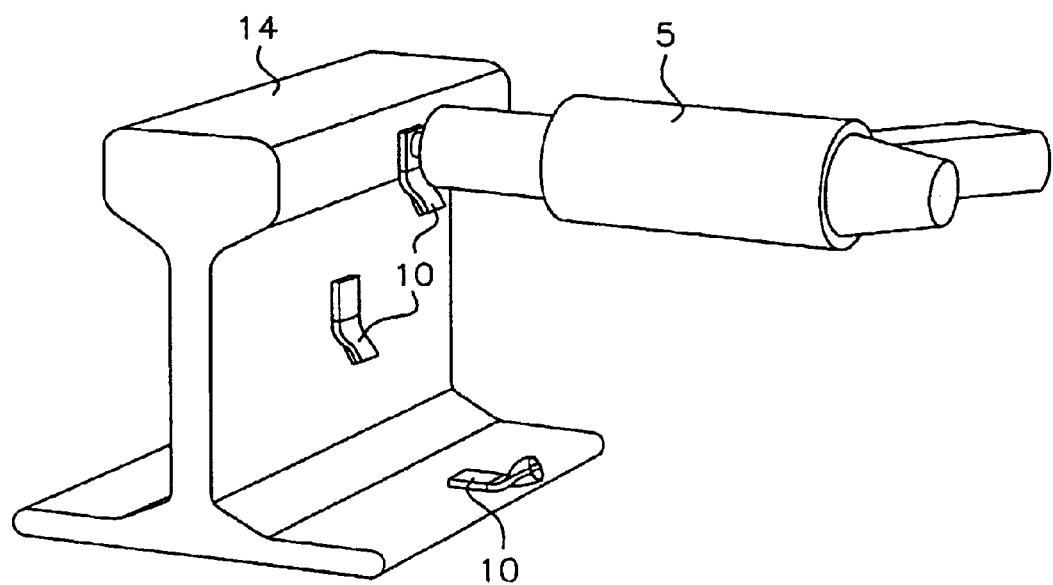
FIG. 5 shows a brazing operation on a rail, in accordance with the present invention.

FIG. 5 shows a brazing gun 5 that is used on a rail 14. An electrically conducting piece 10 in the shape of a cable clip is brazed firmly to the head of the rail. The brazing may also be carried out on the web part or foot of the rail.

Figure 6:
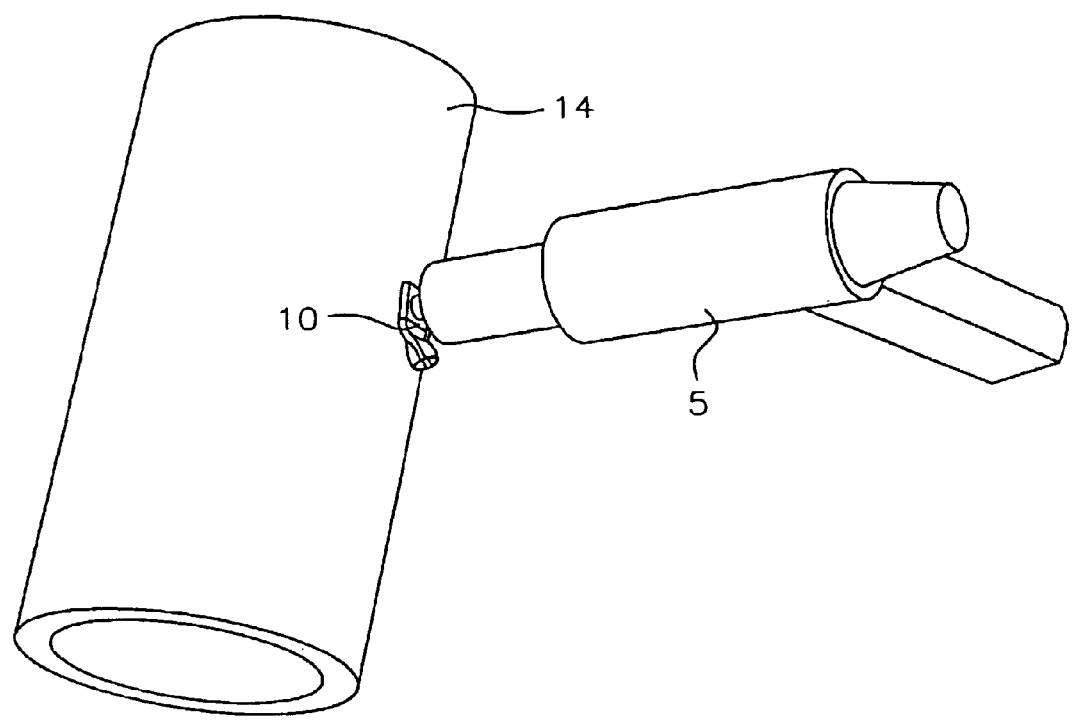
FIG. 6 shows a brazing operation on a pipeline section, in accordance with the present invention.

FIG. 6 shows a brazing gun 5 that is used on a workpiece 14 in the form of a section of piping. An electrically conducting connecting piece 10 in the shape of a cable shoe is brazed firmly to the pipe. Stringent requirements apply above all to piping in nuclear power stations, where brazing has to be carried out without causing structural changes in the piping material that could lead to crack formation. In the case where pipes are filled with gas or oil, and also when they are filled with material that is temperature-sensitive, for example in the chemical industry, it is important to be able to work at low temperatures when brazing.

When thermally-insulating pipes are grounded using the guard ring 9, a significant saving in labour and expenditure is achieved since no insulation has to be removed specifically for grounding.

Figure 7:
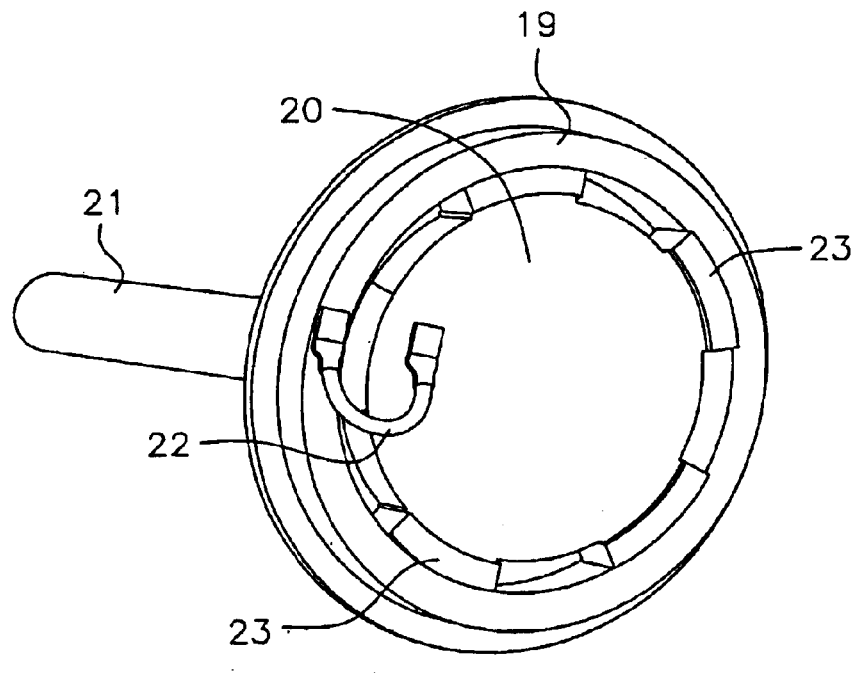
FIG. 7 illustrates a brazed joint between the outer and inner wheel rims of a railway carriage, in accordance with the present invention.

FIG. 7 shows a railway carriage wheel. An inner wheel 20 is secured to the wheel axle 21 and between the inner wheel and an outer wheel ring 19, the so-called tread, is arranged a damper 23 of for example rubber material. The figure shows how a connecting piece 22 of electrically conducting connecting material joins the inner wheel 20 to the outer wheel ring 19 so that a current can pass from the railway carriage to the railway track. On account of the risk of martensite formation and associated crack formation it has not hitherto been attempted to employ pin brazing in this connection. The present brazing process eliminates martensite formation however and enables brazing to be carried out in this field too.

Figure 8:
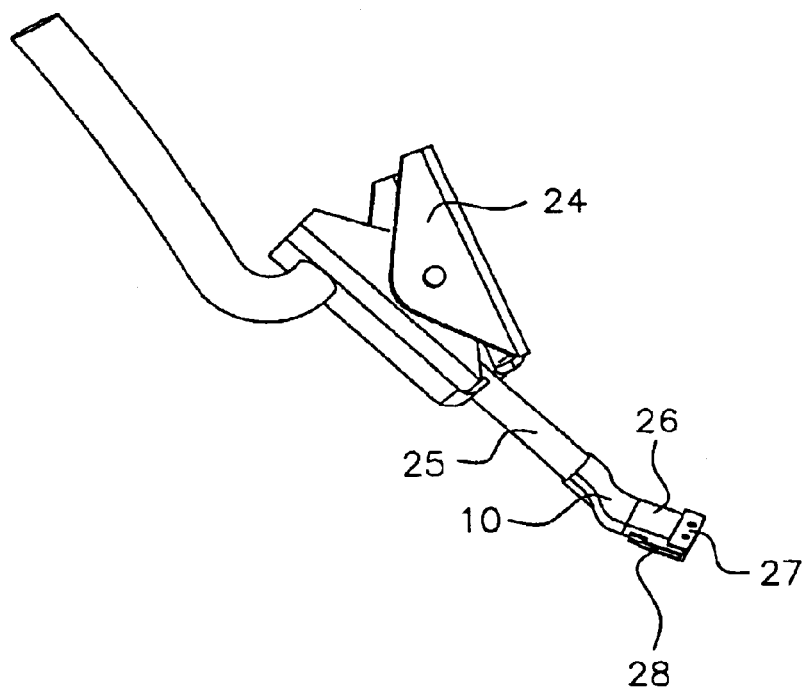
FIG. 8 shows an electrically conducting connecting piece in the form of a cable shoe seen from the side, in accordance with the present invention.

FIG. 8 is a side view of a cable shoe 10, a connecting piece of electrically conducting material, in which a terminal connection 24 to the electrical circuit can be seen. The terminal connection is secured to an electrical connection 25 leading to the cable shoe 10, the other side of which consists of a solid plate 26 of compact material. Around this continuous plate 26 of compact material is arranged a brazing clip 27, which is pressed against the plate 26 of the cable shoe 10 per se, and between the cable shoe 10 and the brazing clip 27 there is a flux material 28 that is activated during the brazing process.

Figure 9:
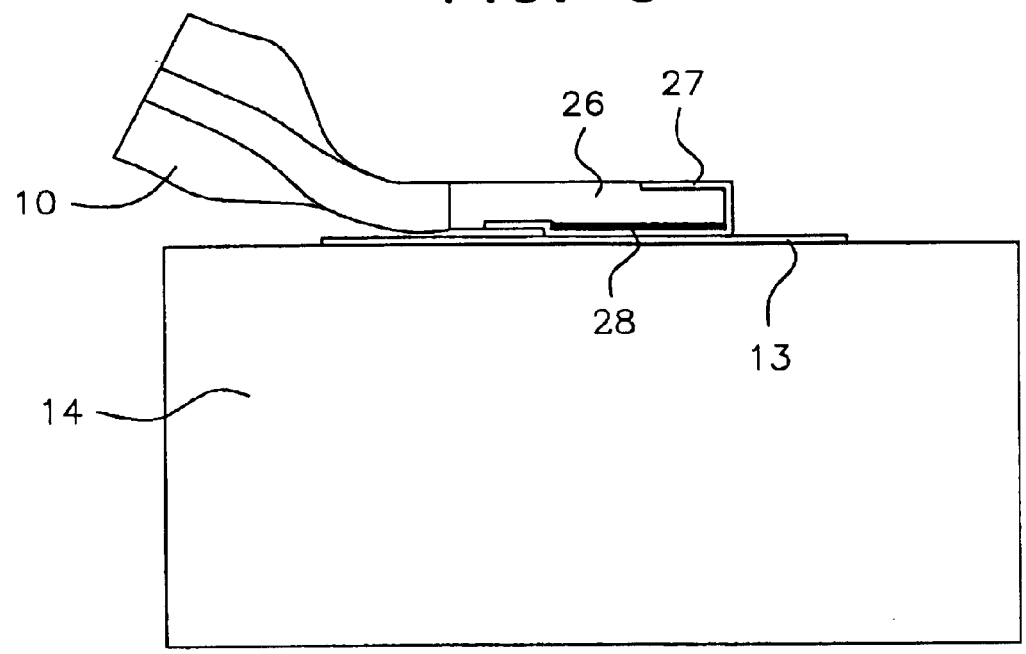
FIG. 9 is a further side view of a cable shoe, in accordance with the present invention.

FIG. 9 is also a side view of a cable shoe 10 in which the brazing per se is performed on a flat continuous compact plate 26 Of the cable shoe 10 by means of the brazing gun 5, and in which can be seen the brazing clip 27, which is pressed against the cable shoe 10, a flux material 28 being heated between the lower side of the cable shoe 10 and the brazing clip 27. Another flux material 13 is provided between the workpiece 14 and the clip 27 and is activated when the brazing clip 27 is heated up and begins to clean the workpiece 14 before brazing of the electrically conducting connecting piece 10.

The brazing clip 27 is of uniform thickness prior to its application to the workpiece to which it is secured. Once the brazing material has been melted by the heat applied through the compact plate 26 of the cable shoe 10, surface tension in the molten material wetting the compact plate 26 and the workpiece 14 leads to a change in thickness, in the sense that the distance between the compact plate 26 and the workpiece, i.e. of the region occupied by the brazing material, is minimised, thus ensuring a firm bond and good electrical and thermal conductivity between the compact plate 26 and the workpiece. The flux material 11 and 13 fulfils the following tasks and has the following properties: 1) cleans the surfaces, 2) removes any oxides present, 3) prevents re-oxidation, 4) is displaced by the molten brazing material, 5) acts as an electrical conductor when the cable shoe 10 is grounded via the rail, 6) facilities dissipation of heat due to the fact that it has a good thermal conductivity, and 7) wets the surfaces that are to be joined.

Another requirement is that the flux material 28 should be activated within a specific temperature range. The flux material, brazing material and brazing process must be matched to one another. The flux material is already activated at the start of the brazing process and will continue to be effective until the brazing has been accomplished.

A brazing that is carried out above ca. 500° C. is termed hard brazing, as opposed to soft brazing, which takes place at lower temperatures. The brazing material that is used in the brazing process is intended for hard brazing. Flux material that is intended for hard brazing is not suitable for the present process since the process takes place too quickly, in about two seconds. In the present brazing process a flux material is used that is suitable for soft brazing and accordingly is activated at a lower temperature, but does not disintegrate before the brazing is completed due to the short operating time.

In order to reach a necessary brazing temperature but using as little energy as possible a large power input is required over a short period of time. Railway track, thick-walled pipes and similar metal profiles are effective heat sinks. A large power input creates a heat front that moves via the cable shoe down into the rail, where the temperature becomes suitable for hard brazing but does not lead to martensite formation.

The cable shoe 10 is a buffer against local overheating and produces a relatively smooth temperature distribution over the whole molten surface. An indirect heating-up takes place by means of a carbon electrode 6. An electric arc 8 is formed between the carbon electrode 6 and the cable shoe 10. This is in contrast to conventional pin brazing, in which an arc acts directly on the rail and/or molten brazing on the rail.

Figure 10A:
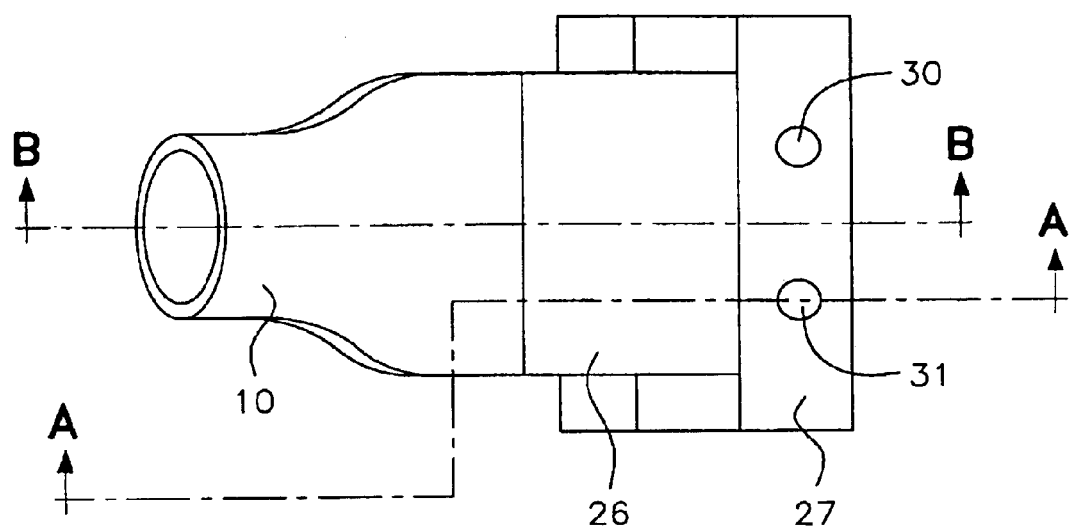
FIG. 10A shows a cable shoe seen from above, in accordance with the present invention.

FIG. 10A is a view from above of a cable shoe 10 with the compact plate 26, in which a brazing clip 27 can be seen that is pressed against the cable shoe 10 and in which two holes 30 and 31 can be seen that lock in place when the brazing clip 27 is pressed against the cable shoe 10. From the figures it can also be seen that the brazing clip 27 is formed so that it is larger than the cable shoe 10 per se and projects beyond the side of the latter. This creates a more secure and more complete assembly of the cable shoe 10 and workpiece 14, and also prevents water penetrating by means of capillary forces between the cable shoe 10 and underlying workpiece 14, and prevents corrosion. Penetrating water may have a negative effect on the mechanical strength of the brazed joint. In addition water can impair the mechanical connection and electrical properties of the connection. Since the brazing clip 27 is larger than the cable shoe 10 a larger joint surface is formed, which leads to a lower electrical transition resistance.

With railway signal systems and cathode protection systems that operate at low voltages and currents, it is particularly important to have a low overall transition resistance in the brazed joints so as to prevent interference in the system.

With large currents and voltages a high transition resistance generates heat in the brazed joint, which may damage and/or melt the latter. For this reason it is important to have a low transition resistance in the brazed joint since the connection also has to handle high return currents in the railway operating system. For a similar reason it is also important that the transition resistance is low in protective groundings.

Figure 10B:
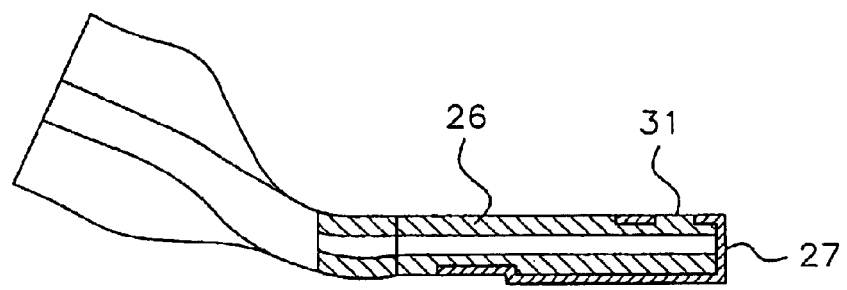
FIG. 10B is a section A—A of FIG. 10A.

FIG. 10B is a section along A—A of FIG. 10A and shows the brazing clip 27 and a hole 31 in which the underlying electrically conducting material projects upwardly from the flat continuous compact plate 26 and forms an attachment between the brazing clip 27 and the connecting piece 10.

Figure 11:
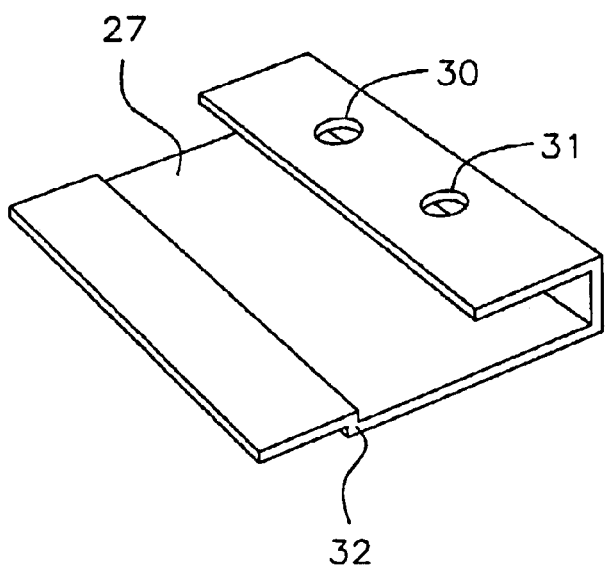
FIG. 11 shows a clip of brazing material, in accordance with the present invention.

FIG. 11 shows only one separate brazing clip 27, which was formed after being pressed onto a cable shoe 10, and there can also be seen two holes 30 and 31 on the upper side of the brazing clip 27 and the special bevelled surface 32 at the other end of the brazing clip 27.

FIG. 12 is a voltage/current diagram of the brazing process. Compared to existing pin brazing, there is no similar large current surge when a short-circuit occurs. Both the voltage and current curves are comparatively more constant over time. The diagram shows that the present invention provides an optimal control of the brazing process. Consequently the temperatures during the brazing process can also be regulated and controlled, which is a prerequisite for obtaining a martensite-free brazing.

Tables I, II and III summarize the results obtained from hardness measurements of rail material with a number of brazing operations carried out according to the present invention.

In Table I, the investigation was of cable connections, USA, head; the extent of the investigation was hardness measurement. The samples were received by the laboratory for hardness measurement of the brazing nearest to the heat-affected zones. Hardness measurements were carried out according to Vickers and with a low load, HV1, an estimated measurement accuracy being 3%.

TABLE I

| Sample No. | Distance from Melt boundary in mm | Hardness HV1 |
|---|---|---|
| 1 | 0.06 | 274 |
|  | 0.19 | 261 |
|  | 0.36 | 269 |
|  | 0.88 | 285 |
|  | Base Material | 285 |
| 2 | 0.06 | 281 |
|  | 0.18 | 276 |
|  | 0.37 | 276 |
|  | 0.87 | 297 |
|  | Base Material | 292 |
| 3 | 0.08 | 313 |
|  | 0.19 | 292 |
|  | 0.38 | 283 |
|  | 0.88 | 307 |
|  | Base Material | 292 |
| 4 | 0.07 | 267 |
|  | 0.18 | 271 |
|  | 0.37 | 288 |
|  | 0.87 | 288 |
|  | Base Material | 290 |
| 5 | 0.07 | 290 |
|  | 0.18 | 285 |
|  | 0.38 | 288 |
|  | 0.88 | 319 |
|  | Base Material | 295 |
| 6 | 0.07 | 255 |
|  | 0.18 | 276 |
|  | 0.37 | 295 |
|  | 0.87 | 305 |
|  | Base Material | 292 |

In Table II, the investigation was of cable connections, UIC 60; the extent of the investigation was hardness measurement. The samples were received by the laboratory for hardness measurement of the brazing nearest to the heat-affected zones. Hardness measurements were carried out according to Vickers and with a low load, HV1, an estimated measurement accuracy being 3%.

TABLE II

| Sample No. | Distance from Melt boundary in mm | Hardness HV1 |
|---|---|---|
| 1 | 0.07 | 292 |
|  | 0.18 | 285 |
|  | 0.38 | 285 |
|  | 0.89 | 288 |
|  | Base Material | 267 |
| 2 | 0.07 | 290 |
|  | 0.17 | 290 |
|  | 0.38 | 285 |
|  | 0.87 | 281 |
|  | Base Material | 321 |
| 3 | 0.10 | 249 |
|  | 0.20 | 251 |
|  | 0.35 | 258 |
|  | 0.88 | 274 |
|  | Base Material | 295 |

In Table III, the investigation was of cable connections, USA, web; the extent of the investigation was hardness measurement. The samples were received by the laboratory for hardness measurement of the brazing nearest to the heat-affected zones. Hardness measurements were carried out according to Vickers and with a low load, HV1, an estimated measurement accuracy being 3%.

TABLE III

| Sample No. | Distance from Melt boundary in mm | Hardness HV1 |
|---|---|---|
| 1 | 0.09 | 297 |
|  | 0.18 | 348 |
|  | 0.38 | 332 |
|  | 0.89 | 348 |
|  | 1.30 | 361 |
|  | Base Material | 358 |
| 2 | 0.09 | 271 |
|  | 0.20 | 330 |
|  | 0.37 | 355 |
|  | 0.89 | 368 |
|  | Base Material | 341 |
| 3 | 0.09 | 345 |
|  | 0.19 | 358 |
|  | 0.39 | 355 |
|  | 0.89 | 355 |
|  | Base Material | 345 |
| 4 | 0.09 | 339 |
|  | 0.19 | 345 |
|  | 0.39 | 355 |
|  | 0.88 | 368 |
|  | Base Material | 355 |
| 5 | 0.10 | 319 |
|  | 0.25 | 355 |
|  | 0.39 | 361 |
|  | 0.89 | 386 |
|  | 1.30 | 341 |
|  | Base Material | 332 |
| 6 | 0.07 | 295 |
|  | 0.19 | 324 |
|  | 0.40 | 341 |
|  | 0.89 | 358 |
|  | Base Material | 336 |
| 7 | 0.09 | 355 |
|  | 0.20 | 339 |
|  | 0.39 | 332 |
|  | 0.89 | 365 |
|  | Base Material | 355 |
| 8 | 0.09 | 319 |
|  | 0.18 | 327 |
|  | 0.39 | 358 |
|  | 0.88 | 378 |
|  | Base Material | 358 |

Figure 13:
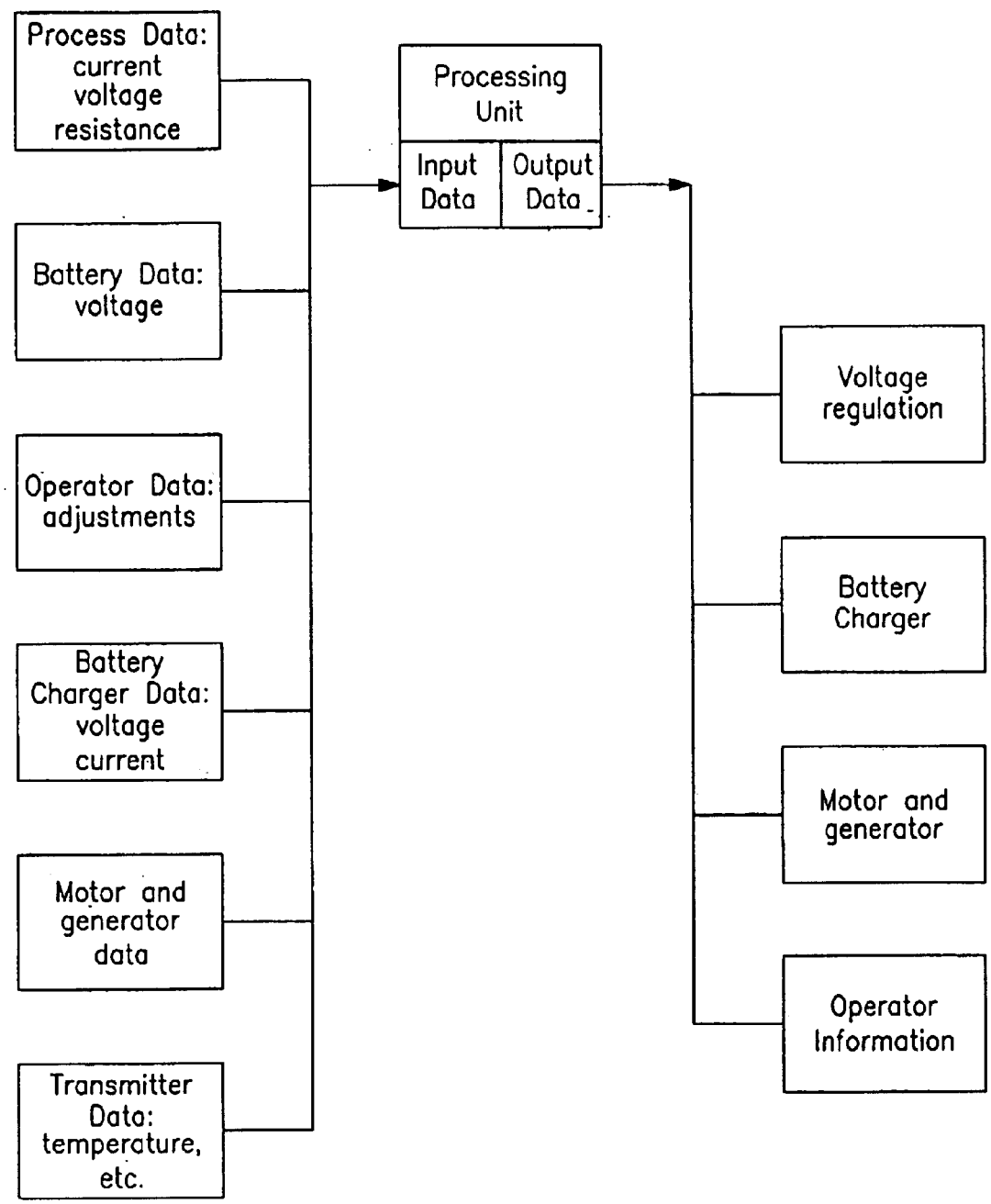
FIG. 13 is a control and regulation flow sheet of the brazing process, in accordance with the present invention.

FIG. 13 shows a regulation and control flow diagram of the brazing process.

Figure 14:
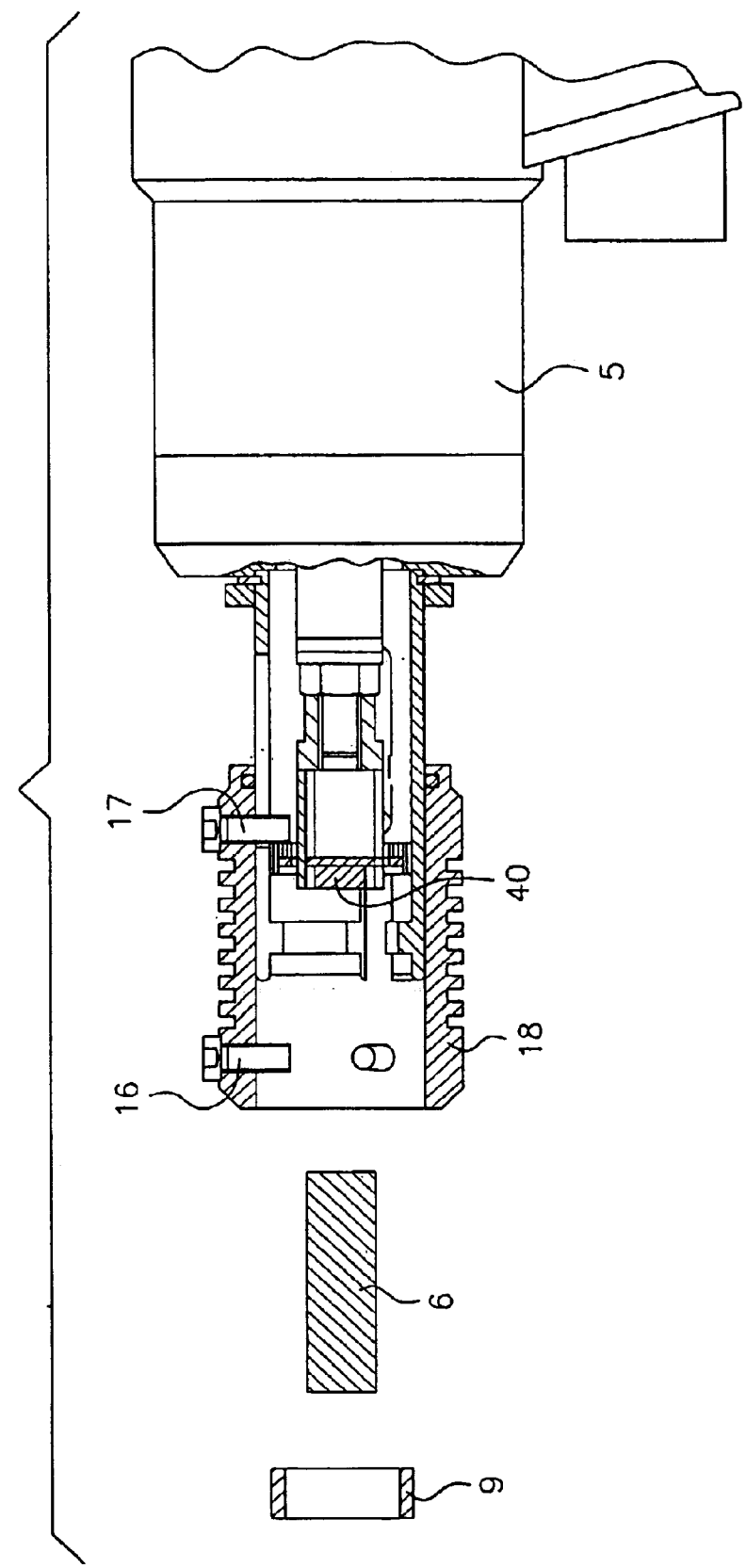
FIG. 14 is a cross-section of the front part of the brazing gun, in accordance with the present invention.

FIG. 14 is a section of the front part of the brazing gun 5 with a gripping sleeve 18 in the retracted position, and an electrode ejector 40 is shown with a screw 16 for a guard ring ejector and a screw 17 for the electrode ejector. The ejected carbon electrode 6 and the ejected guard ring 9 are also shown.

The basic concept of the present invention is to combine various functions and methods in such a way that they co-operate in a new brazing process. The result of the co-operation is a completely new brazing process which is free of structural changes or martensite formation. A carbon electrode is employed in the brazing process whose length and diameter influence the resistance in the electrical circuit and in which the carbon powder that is released from the carbon electrode accumulates as a thin layer on the underlying cable shoe and acts as a temperature buffer and heat distributor. In addition the electric arc is maintained between two carbon poles, which has a stabilising effect on the arc and counteracts the tendency to varying currents over time.

A cable shoe has at least one smooth end of compact, electrically conducting material on which the electric arc from the carbon electrode acts. The lower side of the cable shoe has a clip of brazing material, which is secured during manufacture. The brazing produces a brazed joint of large area, resulting in a lower overall electrical transition resistance. A flux material is present between the cable shoe and the brazing clip, and a flux material is also present between the brazing clip and the workpiece, the flux material, brazing material and brazing process being suitably adapted to one another. The brazing material is suitable for soft brazing and is consequently active over a low temperature range, thereby providing a martensite-free brazing.

The advantages of a guard ring in the brazing process that consists for example of metal or another similar material is that the overall process requires less energy, and also the grounding procedure is facilitated compared to previous procedures. Grounding via the guard ring eliminates the need for special grounding contacts, for example ground terminals or magnetic grounding contacts, as well as the need for special preparation of the grounding carrier. Since in every grounding situation a new guard ring is used, the contact surfaces are always guaranteed to be clean.

The arrangement according to the invention reduces the length of the grounding circuit and eliminates extra transition resistance as well as sources of secondary sparks and arcs between the cable shoe and workpiece. The shape of the guard ring together with the gripping sleeve shields the operator from electric arcs and hot gases during the brazing process.

The use of metal guard rings influences the brazing procedure by virtue of the fact that it utilises more of the energy released in the form of heat and channels it to the cable shoe.

In order to achieve a satisfactory brazing having regard to temperature, not as much electrical energy has to be supplied therefore to the brazing process.

With previously known methods the total intrinsic resistance in the circuit may be regarded as constant. A lower energy supply should in practice mean a shorter process time. However, the time then becomes far too short for a satisfactory brazing to be achieved.

In the present new brazing process one starts with a constant intrinsic resistance in the circuit, so that when the electric arc is fully formed the total resistance is then increased with one or more extra resistors in the circuit. The power that is developed is then lower, and accordingly the time increases.

By regulating the additional resistance and/or regulating the voltage the length of the brazing process can be controlled and in this way a satisfactory martensite-free brazing can be achieved with minimal expenditure of energy and in addition the temperature in the base material/workpiece can also be controlled.

With previously known methods wide margins have been accepted as regards the developed electrical power in the process as well as the total emitted energy and also the overall length of the process. The current was limited either by incorporating a fixed electrical resistance in the circuit, or alternatively by interrupting the process when the necessary amount of emitted energy has been consumed. No account was taken of variations in battery voltage depending on the state of charge of the battery, discharge characteristics or other factors, nor of variations in current during one and the same brazing operation depending on the change in length of the electrode or arc fluctuations, or changes in current between different brazing cases depending on variations in the lifting height. These variations together with simple inadequate arrangements for estimating the amount of energy emitted have resulted in a varying time and varying power output for otherwise comparable brazing processes, as well as difficulties in controlling the temperature in the relevant materials.

In the aforedescribed new brazing process shown in FIG. 13, the brazing temperature and the martensite formation dependent on the latter may be controlled by calculating the electrically developed power and regulating the latter in real time either by an analogue procedure or by a digital procedure with high resolution. The developed power is calculated by instantaneously measuring the current and voltage, and the actual power is calculated as the mathematical product of these quantities. The calculated result is process and fed into a processing unit whose output signal influences a voltage-regulating unit. In this way the voltage and thereby the current are regulated, and the developed electrical power is adjusted to an appropriate value. The processing unit, which may either exist as a separate unit or may be incorporated in the electronics unit 2, processes data in the form of current and voltage values, data from transmitters and operational adjustments, externally connected unite as well as measured elapsed time, and handles this data having regard to physical, mathematical and logic structures in such a way that an appropriate regulation of the developed power takes place over time.

Also, since the regulation is independent of the resistance of the power circuit there is no need to have a fixed installed resistor, and accordingly there is an energy saving since this resistor produces waste heat. In addition a larger amount of energy can be withdrawn from the batteries since at the end of the discharge cycle the batteries can still drive the process despite the falling voltage level since there is no fixed resistor. Moreover the formation of the arc at the starting point of the process is facilitated for two reasons, on the one hand because the lifting height of the electrode and thus the length of the arc and consequently the following starting inertia can be minimised without any risk of excessive currents that in previous methods caused temperature problems and regulating technology problems, and on the other hand much higher current and voltage values than were hitherto possible are allowed at the starting point of the process without being limited to a fixed resistor, and consequently a reliable start to the process can be ensured.

In the aforedescribed new brazing process the aforementioned processing unit also handles signals from external transmitters, for example temperature sensors, as well as operational adjustments whose values affect the output data of the processing unit. In addition signals from external units such as battery chargers, generators and motors are processed; these signals are also processed in the processing unit when appropriate control signals in the form of output data are produced so as to regulate this unit too.

Only some embodiments of the invention have been illustrated in the drawings, but it should be pointed out that many other modifications can be conceived within the scope of the following claims.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. Apparatus for brazing a first workpiece of an electrically conducting material to a second workpiece of electrically conducting material by means of a temperature-controlled brazing process in which the heat necessary for brazing is generated by striking an electric arc, the apparatus including:
   (a) means for engaging a workpiece;
   (b) a carbon electrode;
   (c) means for supporting the carbon electrode including means for moving the carbon electrode between a position in which it engages a workpiece in turn engaged by said means for engaging, and a retracted position in which it is lifted therefrom;
   (d) means for applying a voltage between said workpiece and said carbon electrode, said means for applying a voltage including a voltage-regulating unit;
   (e) a voltage sensor for measuring said voltage;
   (f) a current sensor for measuring the electrical current passing through said carbon electrode;
   (g) processing means including means for generating an output signal controlling said voltage-regulating unit and further including means for calculating, in real time, continuously or continually, the electrical power developed in said arc;
   (h) switching means operable to connect said means for applying a voltage in electrical circuit with said electrode and with such workpiece whereby, when said means for engaging is applied to a workpiece and the switching means is operated to close said electrical circuit, said means for supporting and moving raises the carbon electrode from the workpiece and an electric arc is struck between the electrode and the workpiece, carbon powder released from the carbon electrode during the brazing process accumulates on the underlying workpiece to form a thin layer on the surface of the workpiece, whereby the electric arc is maintained between two carbon poles, which stabilises said arc and distributes the temperature.

2. Apparatus according to claim 1, wherein said means for engaging includes a guard ring around said carbon electrode.

3. Apparatus according to claim 2, in which the guard ring consists of ceramic material.

4. Apparatus according to claim 2, in which the guard ring consists of a combination of a ceramic ring and a ring of electrically conducting material.

5. Apparatus according to claim 2, including a gripping sleeve around said guard ring, whereby the guard ring together with the gripping sleeve shields an operator from the arc and from hot gases.

6. Apparatus according to claim 5, in which the gripping sleeve ejects, with a longitudinal movement, spent carbon electrodes and guard rings.

7. Apparatus according to claim 1, wherein said processing means is additionally capable of controlling external units including battery chargers, generators and motors in order to regulate said units.

8. Apparatus according to claim 1, in combination with a first workpiece for brazing to a second workpiece, the first workpiece having on one side a layer of brazing metal, with a flux layer between the first workpiece and the layer of brazing metal.

9. The combination of claim 8, in which the layer of brazing metal is provided by a brazing clip applied to said first workpiece.

10. The combination of claim 9, in which the brazing clip is larger than said first workpiece so as to provide a larger joining surface and smaller electrical transition resistance.

11. The combination of claim 9, including an electrical connection to the connecting piece to provide a grounding contact for the apparatus.

12. Apparatus for brazing a first workpiece of an electrically conducting material to a second workpiece of electrically conducting material by means of a temperature-controlled brazing process in which the heat necessary for brazing is generated by striking an electric arc, the apparatus including:
   (a) means for engaging a workpiece;
   (b) a carbon electrode;
   (c) means for applying a voltage between said workpiece and said carbon electrode;
   (d) switching means operable to connect said means for applying a voltage in electrical circuit with said electrode and with said workpiece whereby, when said means for engaging is applied to a workpiece and the switching means is operated to close said electrical circuit, the carbon electrode is raised from the workpiece and an electric arc is struck between the electrode and the workpiece, carbon powder released from the carbon electrode during the brazing process accumulates on the underlying workpiece to form a thin layer on the surface of the workpiece, whereby the electric arc is maintained between two carbon poles, which stabilises said arc and distributes temperature.

13. Apparatus for brazing a first workpiece of an electrically conducting material to a second workpiece of electrically conducting material by means of a temperature-controlled brazing process in which the heat necessary for brazing is generated by striking an electric arc, the apparatus including:
   (a) means for engaging a workpiece;
   (b) a carbon electrode;
   (c) means for applying a voltage between said workpiece and said electrode, said means for applying a voltage including a voltage-regulating unit;
   (d) a voltage sensor for measuring said voltage;
   (e) a current sensor for measuring the electrical current passing through said electrode;
   (f) processing means including means for generating an output signal controlling said voltage-regulating unit and further including means for calculating, in real time, continuously or continually, electrical power developed in said arc, and controlling said voltage regulating unit so as to control the power developed and thus the temperature produced and thereby avoid producing structural changes or martensite formation.

* * * * *